United States Patent
Swanson et al.

[11] Patent Number: 6,058,356
[45] Date of Patent: May 2, 2000

[54] HAND-HELD ELECTRONIC INSTRUMENT

[75] Inventors: Gary K. Swanson, Oakville; Philip M. Goulis, Middlefield; Arthur C. Aloise, Harwinton, all of Conn.

[73] Assignee: Cooper Instrument Corporation, Middlefield, Conn.

[21] Appl. No.: 09/070,641

[22] Filed: Apr. 30, 1998

[51] Int. Cl.[7] .................................................. G01K 15/00
[52] U.S. Cl. .......................... 702/99; 364/708.1; 374/208; 374/209; 379/1; 379/21; 379/24; 361/679
[58] Field of Search .................. 702/99, 154; 364/708.1; 374/208, 209; 379/21, 24; 361/679

[56] References Cited

U.S. PATENT DOCUMENTS

| | | |
|---|---|---|
| D. 354,921 | 1/1995 | Narayanan . |
| D. 379,936 | 6/1997 | Wei-Hsin . |
| 3,270,547 | 9/1966 | MacRitchie et al. . |
| 3,568,181 | 3/1971 | Weaver . |
| 4,050,309 | 9/1977 | Junkert et al. . |
| 4,174,631 | 11/1979 | Hammerslag . |
| 4,179,745 | 12/1979 | Wuertele . |
| 4,572,365 | 2/1986 | Bruno et al. . |
| 4,602,871 | 7/1986 | Hanaoka . |
| 4,619,271 | 10/1986 | Burger et al. . |
| 4,627,742 | 12/1986 | Sakamoto et al. . |
| 4,634,294 | 1/1987 | Christol et al. . |
| 4,692,034 | 9/1987 | Fukui et al. . |
| 4,725,150 | 2/1988 | Ishida et al. . |
| 4,730,941 | 3/1988 | Levine et al. . |
| 4,843,577 | 6/1989 | Muramoto . |
| 4,844,623 | 7/1989 | Wada . |
| 4,895,164 | 1/1990 | Wood . |
| 5,008,775 | 4/1991 | Schindler et al. . |
| 5,018,875 | 5/1991 | Cook . |
| 5,056,048 | 10/1991 | Seperant . |
| 5,144,814 | 9/1992 | Gaudette . |
| 5,165,798 | 11/1992 | Watanabe . |
| 5,340,215 | 8/1994 | Makita et al. . |
| 5,410,141 | 4/1995 | Keonck et al. ..................... 235/472.02 |
| 5,575,563 | 11/1996 | Chiu et al. . |
| 5,655,305 | 8/1997 | Fletcher . |
| 5,669,713 | 9/1997 | Schwartz et al. . |

OTHER PUBLICATIONS

Omega the temperature hand book, vol. 29, pp. A–55–A–68, L–10–L12 and L–25–L–26, 1995.

*Primary Examiner*—Marc S. Hoff
*Assistant Examiner*—Hien Vo
*Attorney, Agent, or Firm*—Alix, Yale & Ristas, LLP

[57] ABSTRACT

A hand-held electronic instrument including a unitary, sleeve-shaped housing having a battery compartment and an electronics compartment housing a microcomputer. A sensing probe and a probe mounting member are removably mounted and fluidically sealed to the front end portion of the housing. A battery door assembly fluidically seals the rear end portion of the housing and is removable to provide access to the battery compartment for replacing spent batteries. A latch pin extending laterally from the latch operator of the battery door assembly engages a partition on the housing to retain the assembly to the housing. A battery polarizing plate disposed intermediate the battery and the electrical contacts for the battery ensure that the proper polarity is applied. Software stored in the microcomputer includes a calibration routine for facilitating calibration of the instrument and an energy savings routine for extending the life of the battery.

30 Claims, 8 Drawing Sheets

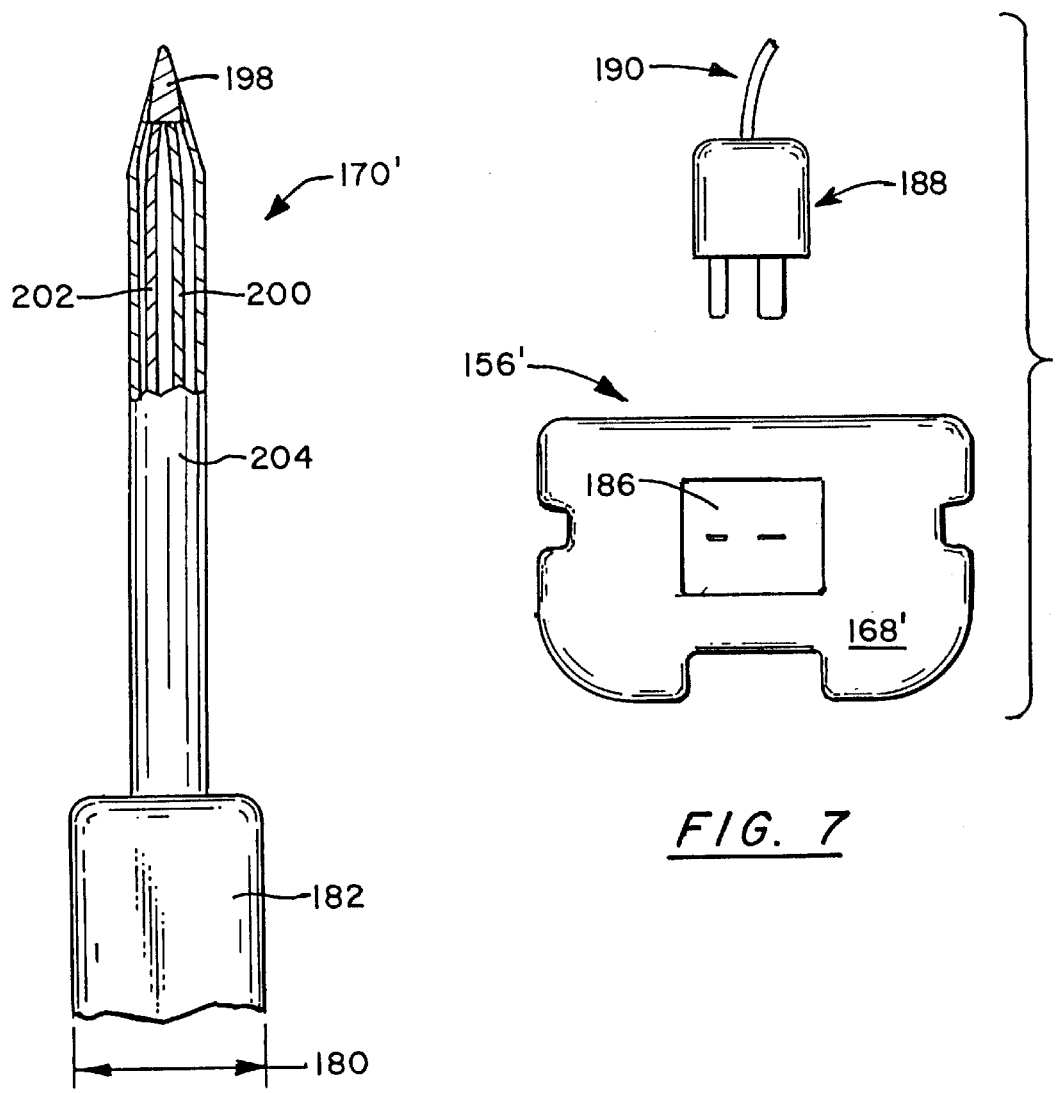
FIG. 6
FIG. 7
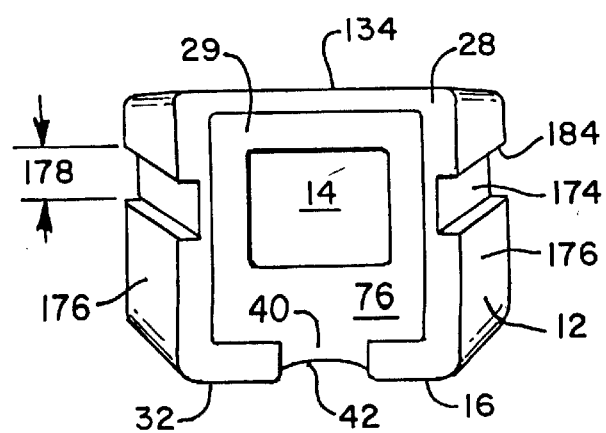
FIG. 10

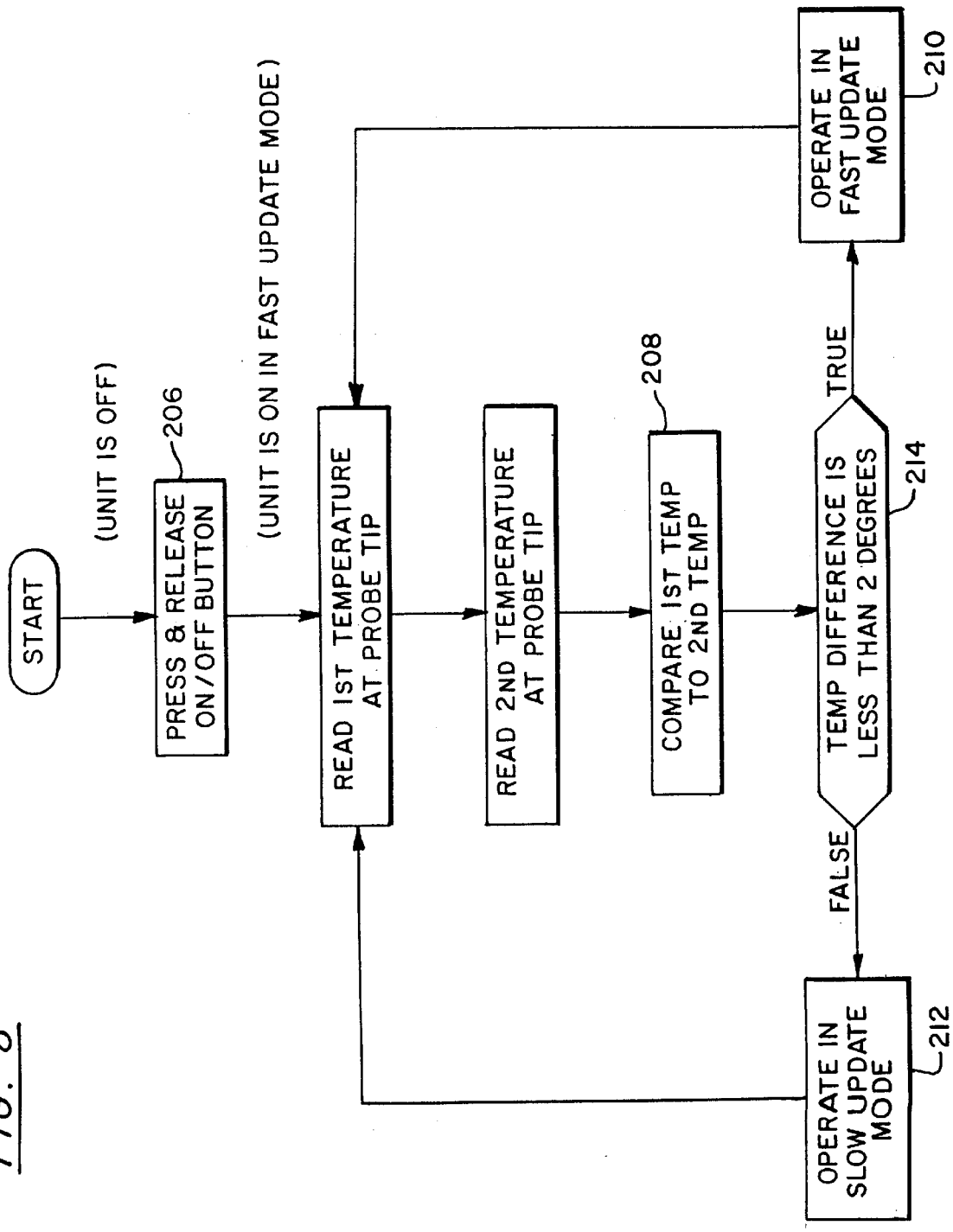

HAND-HELD ELECTRONIC INSTRUMENT

BACKGROUND OF THE INVENTION

This invention relates generally to electronic instruments for measuring a specified parameter. More particularly, the present invention relates to hand-held electronic instruments for measuring parameters such as temperature and humidity.

The use of electronic instruments to measure various environmental parameters has expanded as society has become aware of risk factors associated with these parameters and has endeavored to eliminate or mitigate such risk. For example, during the last decade a number of adverse health incidents associated with undercooked food have been reported in the news media. As a result, health agencies have advocated that foods such as ground beef, chicken, eggs, and fish be cooked to at least a specified minimum temperature to ensure that any bacteria in such foods is destroyed.

Unfortunately, most conventional temperature measurement devices are poorly suited for measuring the internal temperature of cooked food products in a manner that ensures that the desired health benefit is obtained in a cost effective manner. For example, the device must be accurate to ensure that the true temperature is measured and displayed, the device must not require calibration or must be easily calibrated, it must be sufficiently water-proof to allow repeated cleansing of the instrument, it should include features that will preclude the possibility of cross-contamination between food items, and it should have a self-contained power supply to provide mobility and to eliminate electrical hazards. The individual requirements often conflict. For example, a self-contained power supply must be periodically replaced to provide a useable life that exceeds the life of the power supply. It is more difficult, and therefore more expensive, to provide a device that is water-proof and that allows periodic replacement of the power supply.

The under-cooked food problem is further exacerbated in the fast-food industry where large volumes of food are prepared and cooked in relatively short periods of time. Temperature measurement devices intended for use in the fast-food industry must have a fast response time to allow for the high turnover of food products. In addition, fast-food jobs are often entry-level positions and temperature measurement devices designed for the fast-food industry may be operated by workers having marginal educational achievement and/or skills.

SUMMARY OF THE INVENTION

Briefly stated, the invention is a preferred form is a hand-held electronic instrument for measuring an environmental parameter. The instrument includes a unitary, sleeve-shaped housing having a battery compartment and an electronics compartment. An electronic assembly including a microcomputer and a memory for storing a software program and data is mounted within the electronics compartment. A battery disposed within the battery compartment provides polarized electrical power to the electronic assembly. A battery door assembly is removably mounted to the rear end portion of the housing, providing access to the battery compartment and facilitating replacement of a spent battery. The junction of the battery door assembly and the housing is sealed to prevent the introduction of fluids into the interior of the housing. A control pad mounted to the top panel of the housing provides a means of controlling operation of the electronic assembly. The sensing probe is mounted to a probe mounting member which is removably mounted to the front end portion of the housing, facilitating replacement of the sensing probe.

The housing has an ergonomic design to facilitate grasping and using the instrument. For example, the rear end portion of the housing includes a downwardly extending lip that reduces the possibility that the operators hand will slip off the rear end of the instrument. The portion of the housing disposed intermediate the front and rear end portions is tapered from front to rear, reducing the possibility that the operator's hand will slip off the front end of the instrument. The side panels of the housing each include a longitudinally extending groove for receiving and holding the body of the sensing probe.

The battery door assembly includes a door member which is received within a receptacle formed by a rearwardly extending rim on the housing. A latch operator retains the battery door assembly to the housing. An extension portion of a latch operator extends forward from an actuator portion and through a stepped opening in the door member into the interior of the housing. A latch pin extending laterally from the extension portion engages the front surface of a lip that extends inwardly from the housing when the latch operator is rotated. An O-ring disposed intermediate the front face of the actuator portion and a shoulder formed by the stepped opening seals the latch operator to the door member. A gasket seal disposed intermediate the door member and the rear end of the housing seals the door member to the housing. A notch is cut in the lip and rim for receiving a downwardly extending tab on the door member. A portion of the tab extends past an undercut in the lip to facilitate removing the battery door assembly from the housing.

The instrument uses a standard nine-volt battery having a positive, male snap connector and a negative, female snap connector. The instrument includes first and second electrical contacts which are in electrical communication with the electronic assembly and a battery polarizing plate disposed intermediate the battery and the first and second electrical contacts. First and second openings extend through the battery polarizing plate and are sized such that the female snap connector will extend through the first opening but not through the second opening. Consequently, both the male and female snap connectors will not extend through the battery polarizing plate to contact the first and second electrical contacts unless the battery is properly oriented to provide power having the correct polarity. The first and second electrical contacts each comprise a spring having a length selected such that the springs will provide proper electrical contact while being compressed to accommodate all batteries having a length that falls within acceptable standards for nine-volt batteries. A divider rib extends from the front surface of the battery polarizing plate intermediate the first and second electrical contacts to preclude contact between the springs.

The software stored in the memory of the electronic assembly performs several functions. When a temperature sensing probe is mounted to the instrument, a calibration routine in the software provides a two-point calibration method for setting the zero point and the rate without manually accessing the electronic assembly. The probe is placed in an ice-water bath and the calibration routine is initiated by operating the appropriate key(s) on the control pad. The microcomputer verifies that the temperature of the ice-water bath is within a first predetermined temperature range and the operator sets the zero point by matching the temperature displayed by the temperature measurement device to the temperature displayed by the calibration standard with either the UP ARROW key or the DOWN ARROW key. The probe is then placed in a second, higher temperature bath. The microcomputer verifies that the temperature of the second bath is above a predetermined temperature value and the operator sets the rate by matching the temperature displayed by the temperature measurement device to the temperature displayed by the calibration standard with either the UP ARROW key or the DOWN ARROW key. The operator exits the calibration routine by operating the appropriate key(s) on the control pad.

The software also includes an energy saving routine where the microcomputer measures the rate of change of the sensed environmental parameter and switches the sampling frequency of the environmental parameter between a first low sampling rate and a second high sampling rate based on a first predetermined value for the measured rate of change. The energy saving routine may also turn the instrument off when the measured rate of change is below a second predetermined value.

It is an object of the invention to provide a new and improved hand-held instrument that overcomes the deficiencies found in conventional hand-held instruments that are discussed above.

It is also an object of the invention to provide a new and improved hand-held electronic instrument that accurately measures an environmental parameter while being utilized and maintained by a relatively unskilled operator.

It is further an object of the invention to provide a new and improved hand-held electronic instrument that is waterproof, facilitating cleaning of the instrument and precluding cross-contamination.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIG. 6 is a temperature probe, partly in cross section, in accordance with one embodiment of the invention;

FIG. 7 is an exploded front view of an alternate embodiment of the probe mounting member and probe of FIG. 1;

FIG. 8 is a flow diagram of the software energy saving feature;

FIG. 10 is a rear view of the housing of FIG. 1.

DETAILED DESCRIPTION OF THE PREFERRED EMBODIMENT

With reference to the drawings wherein like numerals represent like parts throughout the several figures, a hand-held electronic instrument in accordance with the present invention is generally designated by the numeral 10.

Figure 1:
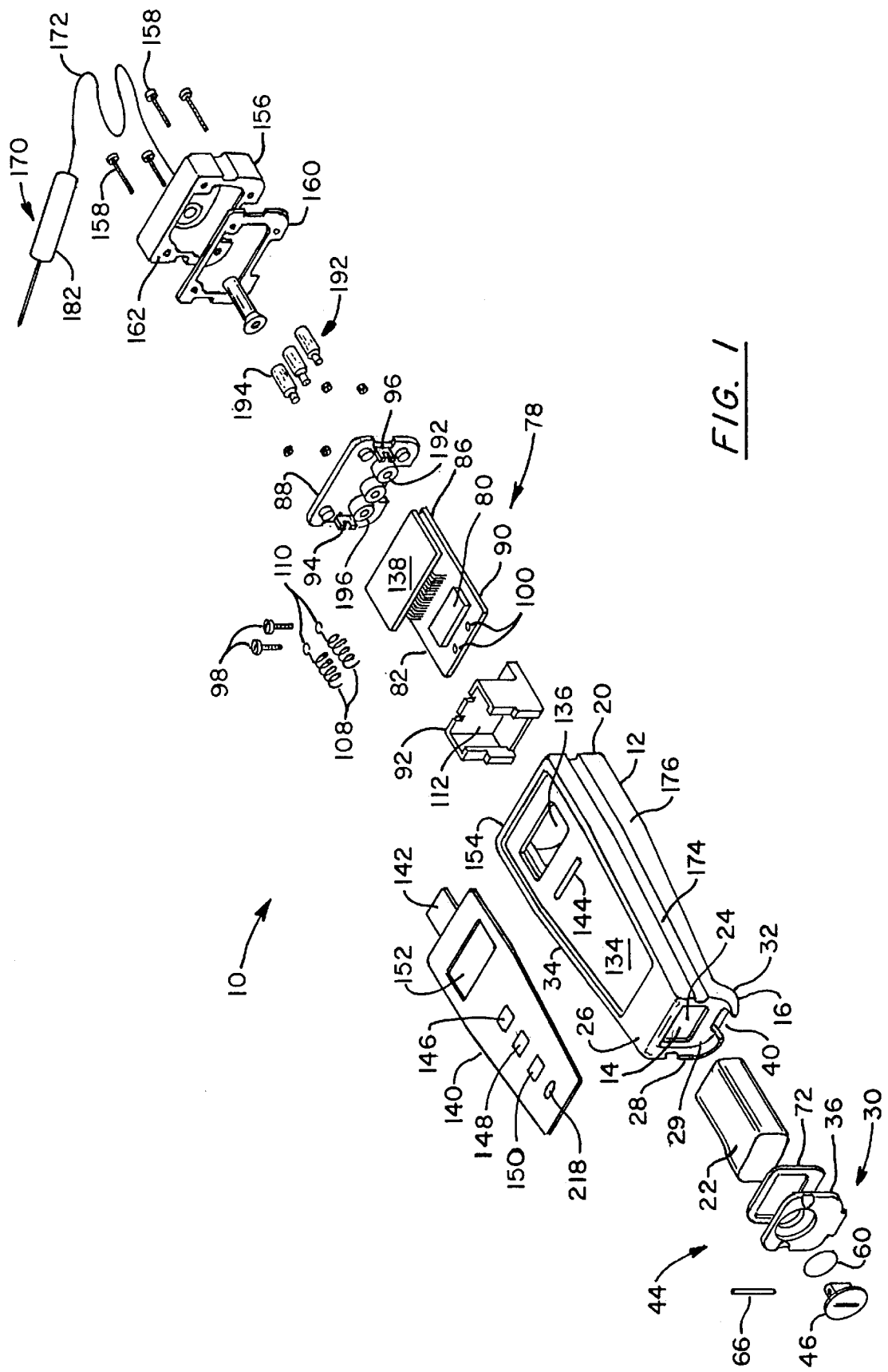
FIG. 1 is an exploded rear perspective view of a hand-held electronic instrument in accordance with the present invention.
Figure 2:
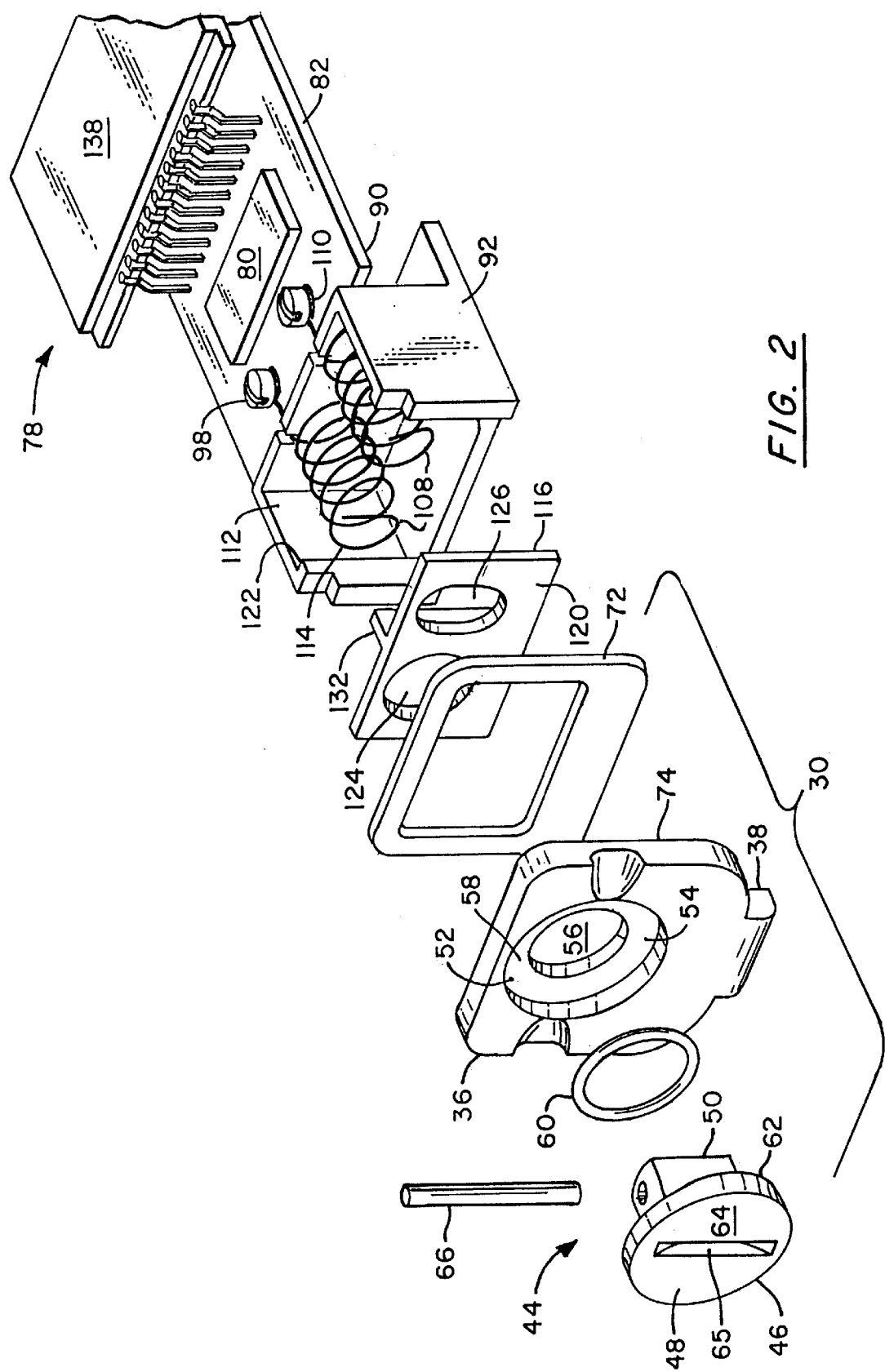
FIG. 2 is an enlarged exploded rear perspective view, partly broken away, of the battery door assembly, battery polarizing plate, mounting bracket, battery tensioning springs, and circuit board of FIG. 1.
Figure 3:
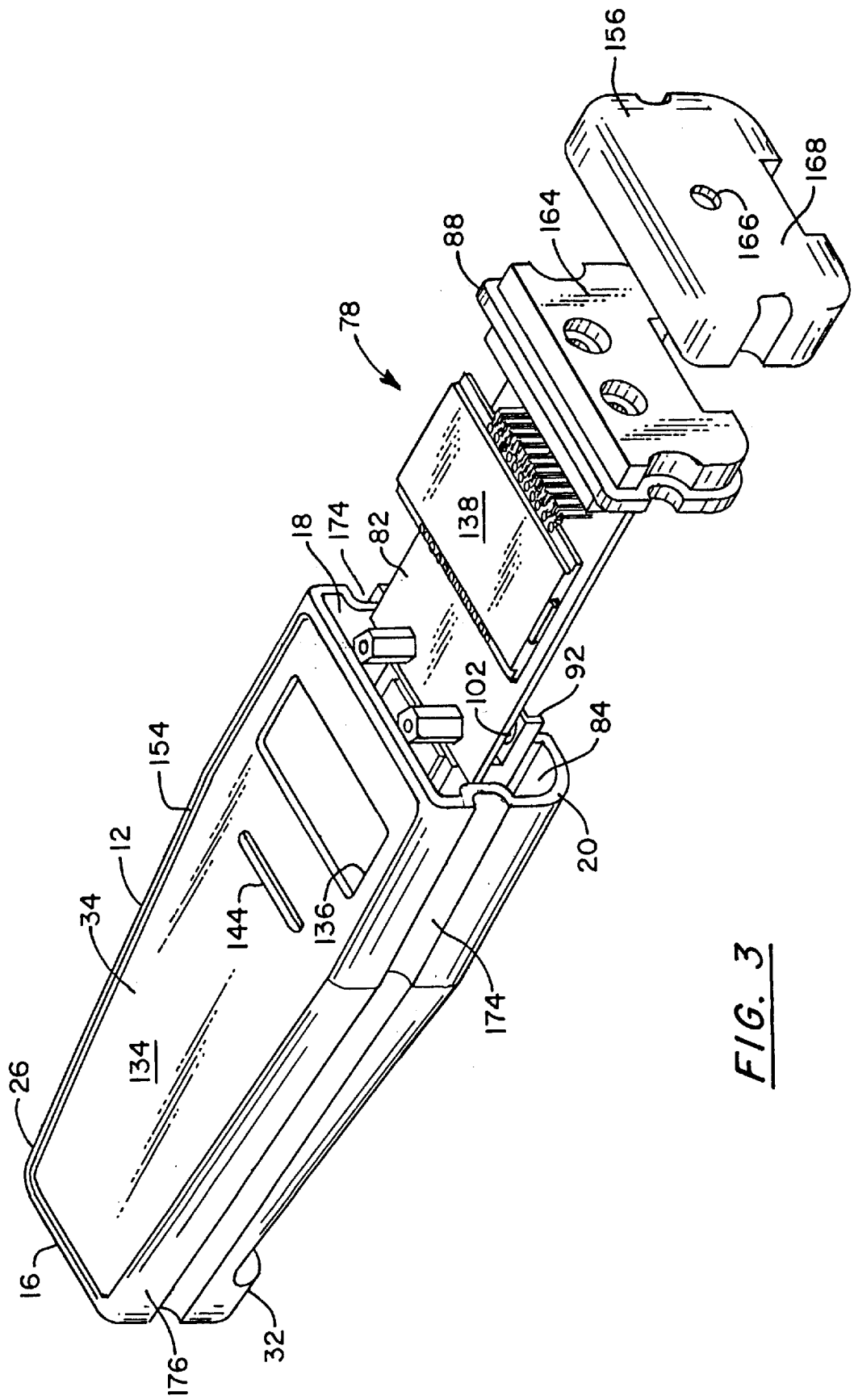
FIG. 3 is an enlarged exploded front perspective view, of the housing, circuit board, front endcap, and probe mounting member of FIG. 1.

With reference to FIGS. 1 and 3, the instrument 10 includes a unitary housing 12 having a rear opening 14 in the rear end 16 and a front opening 18 in the front end 20. A conventional nine (9) volt battery 22 may be inserted into the battery compartment 24 of the housing 12, through the rear opening 14, to provide a renewable internal power supply for the instrument 10. The rear end portion 26 of the housing 12 includes a rearwardly extending rim 28 which forms a receptacle 29 for receiving a battery door assembly 30. The rear end portion 26 also includes a downwardly extending lip 32 which abuts the heel of the operators hand when the instrument 10 is in use to prevent the operator's hand from slipping off the rear end 16 of the housing 12. The intermediate portion 34 of the housing 12 is tapered from front to rear to provide a narrower cross-section proximate the rear end 16 of the housing 12, facilitating grasping the instrument 10 while reducing the possibility that the operator's hand will slip off the front end 20 of the housing 12.

The battery door assembly 30 includes a door member 36 which is received within the receptacle 29 to close the rear opening 14 and retain the battery 22 within the housing 12. A tab 38, which extends from the bottom edge of the door member, is received within a notch 40 in the rear face of the rim 28. As shown in FIG. 10, a portion of the lip 32 has a slight undercut 42. A portion of the tab 38 extends beyond the lip 32 in the undercut portion 42, allowing the operator to easily grasp the tab 38, facilitating removal of the battery door assembly 30 from the housing 12.

Figure 4:
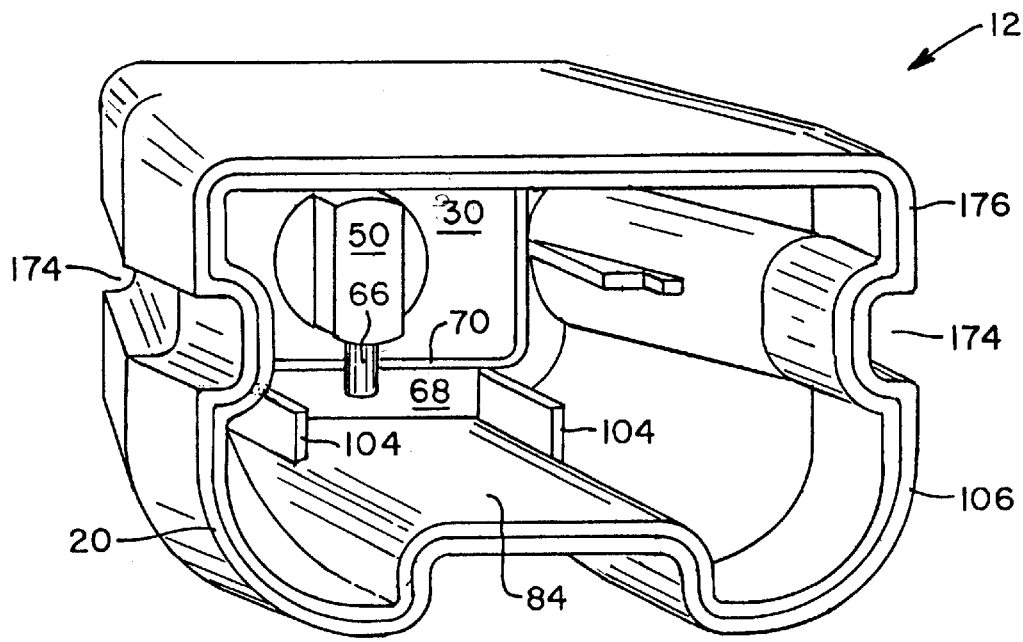
FIG. 4 is an enlarged front perspective view of the housing and battery door assembly of FIG. 1.

The battery door assembly 30 also includes a latch 44 for locking the battery door assembly 30 to the housing 12. The latch 44 comprises a latch operator 46 having an actuator portion 48 and an extension portion 50. The latch 44 is positioned in a stepped, circular orifice 52 in the door member 36. The inside diameter of the rear portion 54 of the orifice 52 is larger than the inside diameter of the front portion 56 of the orifice 52 to form a shoulder 58. An O-ring 60 is disposed intermediate the front face 62 of the actuator portion 48 and the shoulder 58 of the door member 36 to form a fluid-tight seal therebetween. The O-ring 60 may be positioned in a circular groove (not shown) on the front face 62 of the actuator portion 48. The rear face 64 of the actuator portion 48 has a groove 65 for receiving a coin, screwdriver blade, or the like for rotating the latch operator 46. A latch pin 66 extends traversely through the extension portion 50 and is disposed within the housing 12 such that the end portions of the latch pin 66 engage the front surface 68 of a partition 70 in the housing 12 (FIG. 4) to secure the battery door assembly 30 to the housing 12.

A first gasket seal 72 is disposed intermediate the front surface 74 of the door member 36 and the rear face 76 of the partition 70 to provide a fluid tight seal between the door member 36 and the face 76 of the partition 70. In one preferred embodiment, the first gasket seal 72 is mounted to the front surface 74 of the door member 36 to properly position the gasket seal 72 and eliminate the possibility that the first gasket seal 72 may be misplaced when the battery door assembly is removed from the housing 12 to replace the battery 22.

An electronic assembly 78 including a microcomputer 80 mounted on a circuit board 82 is housed in the central electronics compartment 84 of the housing 12. The front end portion 86 of the circuit board 82 is mounted to the front endcap 88 of the housing 12 and the rear end portion 90 is mounted to a mounting bracket 92 (FIG. 3). Preferably, the two front corners of the circuit board 82 are captured within slots 94 in a pair of mounting posts 96 that extend rearward from the front endcap 88. Two screws 98 extend through a pair of openings 100 in the rear end portion 90 of the circuit board 82 and engage a pair of upwardly extending mounting posts 102 on the mounting bracket 92. The mounting bracket 92 and circuit board 82 are inserted into the housing 12 through the front opening 18 until the rear end of the mounting bracket 92 engages positioning tabs 104 which extend from the inner surface of the housing 12. The front endcap 88 is mounted and hermetically sealed to the front end 20 of the housing 12 to close the front opening 18. In one preferred embodiment (FIG. 4), a rim 106 extends from the front end 20 of the housing 12, forming a receptacle for at least partially receiving the front endcap 88.

Figure 5:
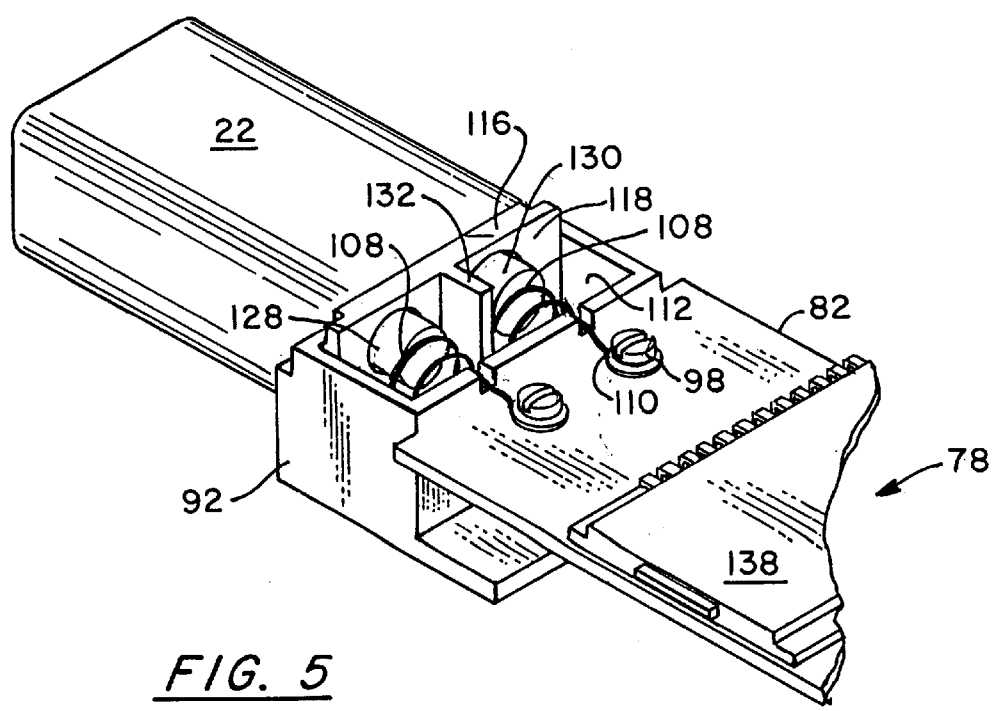
FIG. 5 is an enlarged front perspective view, partly broken away, of the battery, battery polarizing plate, mounting bracket and circuit board of FIG. 1.

The electrical supply path from the battery 22 to the electronic assembly 78 is provided by a pair of springs 108. An eye 110 on one end of each spring 108 is mechanically and electrically mounted to the circuit board 82 via screws 98. Each spring 108 extends rearward into a cavity 112 in the mounting bracket 92 to a second end 114 which engages a battery polarizing plate 116. As shown in FIG. 5, the springs 108 engage the front surface 118 of the battery polarizing plate 116, biasing it rearwardly such that a portion of the rear surface 120 engages laterally extending wings 122 in the rear end portion of the mounting bracket 92.

First and second orifices 124, 126 extend through the battery polarizing plate 116. When the battery 22 is installed, the positive, male snap connector 128 and the negative, female snap connector 130 on the nine volt battery 22 extend through the orifices 126, 124 to mechanically and electrically engage the springs 108. The sizes of the first and second orifices 124, 126 are selected such that the female snap connector 130 may extend through the first orifice 124 but not the second orifice 126, thereby ensuring that the positive and negative poles of the battery 22 are electrically connected to the electronic assembly 78 in the proper manner. Since the battery polarizing plate 116 ensures the proper polarity of the power supply, the electronic assembly 78 does not need to include a circuit that would prevent application of power from an improperly installed battery 22. A divider rib 132 extends from the front surface 118 of the battery polarizing plate 116 between the springs 108, preventing contact between the springs 108. The battery 22 may engage the rear surface 120 of the battery polarizing plate 116 and move the battery polarizing plate 116 forward against the biasing force of the springs 108. The length of the cavity 112 and the length of the springs 108 are selected such that proper electrical contact will be maintained for all batteries 22 having a length within the tolerances specified by the applicable industry standard for nine volt batteries.

As shown in FIGS. 1 and 3, the top panel 134 of the housing 12 has an opening 136 for viewing a liquid crystal display screen 138 mounted on the circuit board 82. An operator pad 140 is mounted to the top panel 134 and provides a fluid tight seal which prevents the introduction of liquid and other materials through the display opening 136. A ribbon cable 142 extends through a slot 144 in the top panel 134 to provide a signal path between the operator pad 140 and the electronic assembly 78. The operator pad 140 also provides a fluid tight seal to close the slot 144. Preferably, the operator pad 140 includes an ON/OFF touch control 146, a multi-use F/UP ARROW touch control 148 and a multi-use C/DOWN ARROW touch control 150, and a sealed viewing window 152. In the embodiment shown in FIGS. 1 and 3, the top panel 134 of the housing 12 may include an upwardly extending rim 154 having a height that is at least equal to the thickness of the operator pad 140. When the operator pad 140 is installed, the rim 154 surrounds the edge of the operator pad 140, protecting the edge from an accidental engagement with a foreign object that might loosen the seal between the operator pad 140 and the housing 12.

A probe mounting member 156 is affixed to the front endcap 88 of the housing 12 by four screws 158. A second gasket seal 160 is disposed intermediate the rear face 162 of the probe mounting member 156 and the front face 164 of the front endcap 88 to provide a watertight seal therebetween. In one preferred embodiment, the second gasket seal 160 is mounted to the rear face 162 of the probe mounting member 156 to properly position the gasket seal 160 and eliminate the possibility that the second gasket seal 160 may be misplaced when the probe mounting member 156 is removed from the housing 12.

In the embodiment shown in FIGS. 1 and 3, an opening 166 extends through the front end portion 168 of the probe mounting member 156 for receiving and mounting a portion of the probe 170. For example, the electrical lead 172 for the probe 170 may extend through and be mounted within the opening 166 to provide a flexible mount. Probes 170 that are flexibly mounted to the probe mounting member 156 in this manner may be stored in longitudinally extending grooves 174 in the side panels 176 of the housing 12 when they are not in use. The widths 178, 180, respectively, of the groove 174 and probe body 182 are selected such that frictional engagement between the probe body 182 and the walls 184 of the groove 174 retains the probe 170 within the groove 174. Alternatively, the probe body 182 may extend into the opening 166 and sealed thereto to provide a rigid connection between the probe 170 and the probe mounting member 156. In the embodiment of FIG. 7, an electrical connector 186 is mounted in the front end portion 168' of the probe mounting member 156' for receiving the corresponding electrical connector 188 of a probe 190, such as a temperature probe. The probe 190 may be removed from the instrument by simply disconnecting the connector 188, facilitating replacement of the probe 190.

Electrical mounting posts 192 extend longitudinally through the front endcap 88 and are fluidically sealed thereto. The wires within the electrical lead 172 of the probe 170 or the electrical connector 186 are electrically connected to the front end portions 194 of the mounting posts 192 and electrical leads (not shown) electrically connect the rear end portions 196 of the mounting posts 192 to the electronic assembly 78. The probe mounting members 156, 156' of the first and second embodiments are interchangeable such that a permanently mounted probe may be exchanged for a removably mounted probe by removing the probe mounting member 156' of the second embodiment and replacing it with a probe mounting member 156 of the first embodiment.

One preferred embodiment of the instrument includes a thermocouple temperature probe 170' having welded tip 198, as shown in FIG. 6. In conventional thermocouple temperature probes, the chromel and alumel leads extend to the tip of the probe and are mechanically bonded together or soldered together. Although such bonding methods provide the proper electrical connection, they produce crevices that can trap particles of the substance that is being monitored. Such trapped particles can lead to contamination of subsequently tested substances. As shown in FIG. 6, the distal ends of the chromel and alumel leads and the tip of the stainless steel probe shell are welded together to form an integral probe tip. During the weld process the material at the distal ends of the chromel and alumel leads 200, 202 and the tip of the stainless steel probe shell 204 melt together to form a probe-tip 198 composed of a substantially homogenous material, forming a seamless and crevice-less surface. Experiments have shown that the temperature response characteristics for a probe 170' of this type are substantially the same as for conventional probes of like materials and dimensions.

The microcomputer 80 may be programmed to utilize most conventional probes, allowing the instrument 10 to be used as a temperature measuring device or a humidity measuring device, for example. Software stored in the microcomputer includes an energy saving routine that prolongs the life of the battery 22. As illustrated in FIG. 8, the instrument is placed in a fast update mode 206 when it is initially turned on by pressing and releasing the ON/OFF button 146. As long as the instrument is on, the microcomputer 80 monitors the rate of change 208 of the sensed parameter and switches the instrument between the fast update mode and a slow update mode depending on the sensed rate of change. When the rate of change is above a predetermined value, the microcomputer samples the parameter and updates the display at a "fast" rate 210. If the rate of temperature change falls below this predetermined value, the microcomputer samples the parameter and updates the display at a "slow" rate 212. Consequently, the energy expenditure required to sample the parameter and update the display 138 is reduced when the value of the sensed parameter is not changing at a rapid rate. In the example provided in FIG. 8, the temperature measuring instrument switches to the slow update mode 212 when a second temperature is less than two (2) degrees different from an earlier sensed first temperature 214. Conversely, the temperature measuring instrument switches to a fast update mode 210 when the difference between second temperature and the first temperature is at least two (2) degrees 214. In one preferred embodiment, the microcomputer turns the instrument "off" if the sensed parameter does not change for 2 minutes.

The software also performs functions that are normally performed by separate components in conventional electronic instruments and functions that require a trained technician. For example, conventional temperature measurement instruments are generally calibrated using a two point calibration methodology. To calibrate the instrument, a calibration standard and the instrument temperature probe are placed in a first, ice-water bath. When the temperature sensed by probe and calibration standard have stabilized, the zero point is set by adjusting the zero adjust potentiometer until the displayed temperature matches the temperature displayed on the calibration standard. The probe and a calibration standard are then placed in a second bath having a higher temperature. When the temperature sensed by probe and calibration standard have stabilized, the rate is set by adjusting the rate potentiometer until the displayed temperature matches the temperature displayed by the calibration standard. The zero point is verified by placing the probe and a calibration standard back in the first bath. If the temperature displayed on the instrument is not sufficiently close to the temperature displayed on the calibration standard, the above procedure is repeated until the zero point temperature displayed on the instrument is within an acceptable range of the temperature sensed by the calibration standard.

It should be appreciated that the calibration procedure for conventional temperature measurement devices requires a pair of potentiometers that are accessible from outside the device. The procedure must be conducted by a technician that has been trained to differentiate the potentiometers from other components of the device and who is careful to prevent contact between the screwdriver that is used to adjust the potentiometers and other components of the device.

Figure 9A:
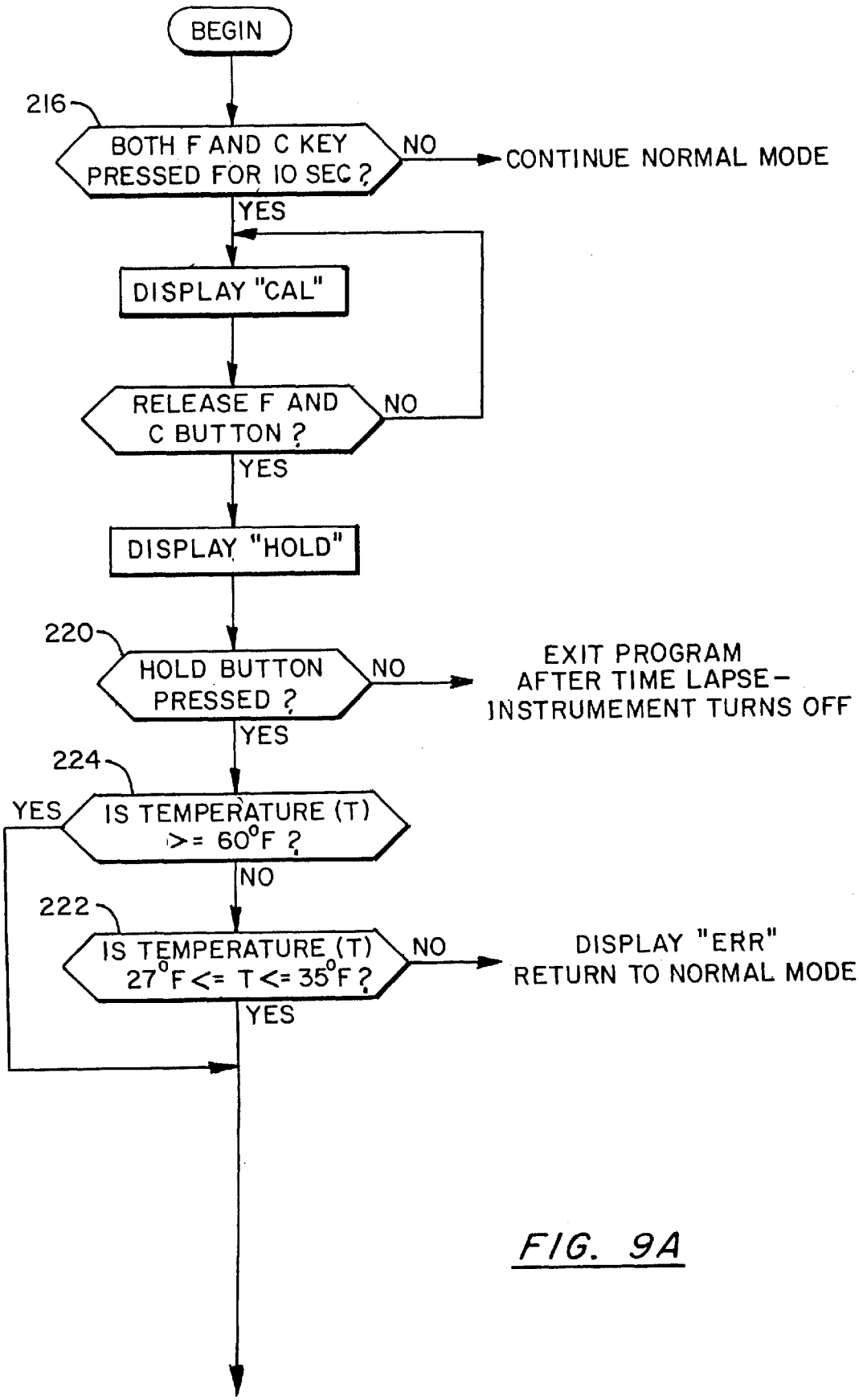
FIG. 9 is a flow diagram of the software field calibration procedure.
Figure 9B:
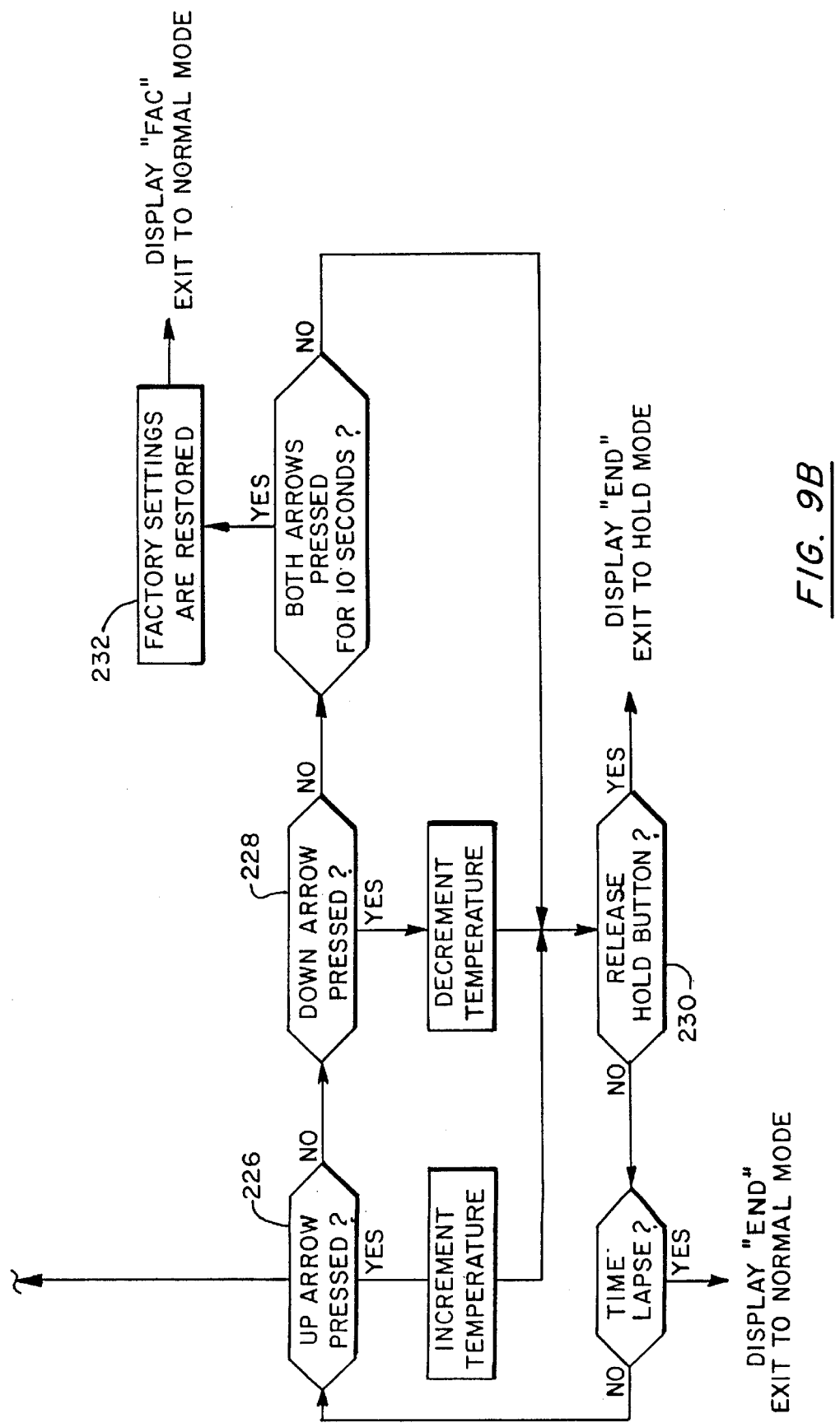

A two-point calibration procedure is also used to calibrate a temperature measurement device in accordance with the invention. Similar to the conventional procedure, the temperature probe and a calibration standard are placed in the first, ice-water bath. As shown in FIGS. 1 and 9, the operator simultaneously presses the F and C keys 148, 150 for ten (10) seconds to initiate the calibration software routine 216. The operator then presses the HOLD button 218 (which is hidden under the "Cooper" logo on the operator pad 140, FIG. 1) 220 and the microcomputer 80 determines whether the zero point 222 (sensed temperature equal to 32° F.±5°) or the rate 224 (sensed temperature >60° F.) is being set. The ice-water bath will cause the probe 170 to sense a temperature within the range of 32° F.±5°, allowing the zero point to be set. The zero point is set by adjusting the displayed temperature, utilizing the UP ARROW 148 or the DOWN ARROW 150 to either raise 226 (increment) or lower 228 (decrement) the displayed reading to match the reading of the calibration standard. The probe and a calibration standard are then placed in the second, higher temperature bath. When the temperature sensed by the instrument has stabilized at a value greater than 60° F. 224, the rate is set by adjusting the displayed temperature 226, 228, utilizing the UP ARROW 148 or the DOWN ARROW 150, to match the temperature displayed by the calibration standard. The temperature measurement instrument is then fully calibrated. Releasing 230 the HOLD button 218 instructs the microcomputer to exit the calibration mode. The microcomputer may be reset to the factory settings 232 by depressing both the UP ARROW 148 and the DOWN ARROW 150 at the same time.

Although this procedure requires operator action, the degree of training required to perform this procedure is substantially less than is required to perform a two point calibration on a conventional temperature measuring device. In addition, the technician performs the calibration procedure only once. Further, the technician does not have to access any internal components of the instrument 10, eliminating the need for one or two openings in the housing 12 that must be sealed to prevent the entry of fluids.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A hand-held electronic instrument for measuring an environmental parameter comprising:

a housing having oppositely disposed front and rear end portions and a top panel, the housing defining a battery compartment and an electronics compartment adjacent the battery compartment;

an electronic assembly disposed within said electronics compartment of said housing including a microcomputer comprising a memory for storing a software program and data, said battery compartment facilitating electrical communication between a battery disposed therein and said electronic assembly for providing polarized electrical power to said electronic assembly;

a control pad mounted to said top panel of said housing for controlling the operation of said electronic assembly;

a front endcap mounted to said front end portion of said housing and fluidically sealed thereto;

a probe mounting member removably mounted to said front endcap and fluidically sealed thereto;
a sensing probe mounted to said probe mounting member, said sensing probe being in electrical communication with said electronic assembly; and
a battery door assembly removably mounted and fluidically sealed to said rear end portion of said housing for providing access to said battery compartment.

2. The hand-held electronic instrument of claim 1 wherein said sensing probe comprises a thermocouple for sensing temperature having a chromel lead, an alumel lead, a stainless steel shell, and a tip of substantially homogenous material formed thereby.

3. The hand-held electronic instrument of claim 1 wherein said rear end portion of said housing includes an outwardly extending lip.

4. The hand-held electronic instrument of claim 1 wherein said housing comprises an intermediate portion disposed intermediate said front and rear end portions, said intermediate portion tapering from front to rear.

5. The hand-held electronic instrument of claim 1 wherein said housing comprises oppositely disposed side panels and said sensing probe comprises a probe body, at least one of said side panels defining a longitudinally extending groove configured to receive said probe body and frictionally retain said probe body in said groove.

6. The hand-held electronic instrument of claim 1 wherein said housing defines a front opening and said instrument further comprises a plurality of electrical mounting posts extending through said front endcap and fluidically sealed to said endcap and in electrical communication with said electronic assembly.

7. The hand-held electronic instrument of claim 6 wherein said sensing probe comprises a probe body and an electrical lead and said probe mounting member defines an opening for receiving and mechanically mounting one of said probe body or said electrical lead, said electrical lead being electrically mounted to said electrical mounting posts.

8. The hand-held electronic instrument of claim 7 wherein said probe body is received and mounted in said opening of said probe mounting member, whereby said sensing probe is rigidly mounted to said probe mounting member.

9. The hand-held electronic instrument of claim 7 wherein said electrical lead is received and mounted in said opening of said probe mounting member, whereby said sensing probe is flexibly mounted to said probe mounting member.

10. The hand-held electronic instrument of claim 6 wherein said sensing probe comprises an electrical lead terminating in a electrical connector and said probe mounting member comprises an electrical connector in electrical communication with said electrical mounting posts, said electrical connector of said sensing probe being mountable to said electrical connector of said probe mounting member to provide electrical communication between said sensing probe and said electronic assembly.

11. The hand-held electronic instrument of claim 6 further comprising gasket seal disposed intermediate said front endcap and said probe mounting member.

12. The hand-held electronic instrument of claim 1 wherein said housing defines a rear opening and comprises an inwardly extending partition disposed proximate said rear opening and said battery door assembly comprises a door member, a latch operator, and a latch extending from said latch operator for engaging said partition to secure said battery door assembly to said housing.

13. The hand-held electronic instrument of claim 12 wherein said rear end portion of said housing comprises a rearwardly extending rim defining a receptacle for receiving said door member.

14. The hand-held electronic instrument of claim 13 wherein said rear end portion of said housing includes a positioning notch and said door member includes a tab which is disposable in said notch upon mounting said battery door assembly on said housing.

15. The hand-held electronic instrument of claim 14 wherein said notch defines an undercut and said tab has a length, wherein at least a portion of said tab extends laterally into said undercut when said door assembly is mounted to said rear end portion of said housing.

16. The hand-held electronic instrument of claim 12 wherein said door member defines an orifice extending therethrough and said latch operator comprises an exterior actuator portion and an extension portion extending through said orifice, said latch extending laterally from said extension portion.

17. The hand-held electronic instrument of claim 16 wherein said orifice comprises front and rear portions and an abutment shoulder therebetween, wherein at least a portion of said actuator portion confronts said shoulder and encloses said orifice.

18. The hand-held electronic instrument of claim 17 wherein said orifice is substantially circular, said front and rear portions of said orifice each have a diameter, said diameter of said rear portion being greater than said diameter of said front portion defining said shoulder, and at least a portion of said actuator portion is disposed in said rear portion of said orifice.

19. The hand-held electronic instrument of claim 16 wherein said actuator portion includes a groove and said battery door assembly further comprises an O-ring seal disposed in said groove, whereby said O-ring fluidically seals said actuator portion to said door member while permitting actuation of said latch.

20. The hand-held electronic instrument of claim 19 wherein said battery door assembly further comprises a gasket seal disposed intermediate said door member and said rear end portion of said housing, whereby said gasket seal fluidically seals said door member to said rear end portion of said housing.

21. The hand-held electronic instrument of claim 1 wherein said electronic instrument further comprises first and second electrical contacts in electrical communication with said electronic assembly and a battery polarizing plate disposed intermediate said battery compartment and said first and second electrical contacts, said battery polarizing plate having means for assuring proper mounting of a battery within the battery compartment to provide polarized electrical power.

22. The hand-held electronic instrument of claim 21 including biasing means urging said battery polarizing plate toward said battery compartment for engagement with a battery inserted into said battery compartment to load said biasing means while maintaining electrical communication between said battery and said electronic assembly.

23. The hand-held electronic instrument of claim 22 wherein said biasing means includes a pair of compression springs and said battery polarizing plate further comprises a divider rib extending forwardly intermediate said springs.

24. The hand-held electronic instrument of claim 21 further comprising a battery having a positive, male snap connector and a negative, female snap connector, said male and female snap connectors each having a diameter wherein said diameter of said female snap connector is greater than said diameter of said male snap connector, and said battery polarizing plate defines first and second openings, said first and second openings each having a size selected such that said female snap connector will extend through said first opening but not through said second opening, wherein said female snap connector extends through said first opening and said male snap connector extends through said second opening to contact said first and second electrical contacts, respectively, to provide polarized electrical power.

25. The hand-held electronic instrument of claim 1 wherein said sensing probe senses temperature, said software stored in said memory of said microcomputer includes a calibration routine for setting the zero point and the rate of said electronic instrument without manually accessing said electronic assembly.

26. The hand-held electronic instrument of claim 25 wherein said electronic assembly includes a display for displaying the sensed temperature, said control pad comprises a HOLD button, an F/UP ARROW button, and a C/DOWN ARROW button, said software comprises means for initiating said calibration routine when said F and said C buttons are depressed simultaneously, and said calibration routine comprises means for sensing when said HOLD button is being depressed, means for differentiating when said sensing probe is placed in a first bath having a temperature of 32° F.±5° from when said sensing probe is placed in a second bath having a temperature of >60° F., and means for adjusting the displayed temperature when either the UP ARROW or DOWN ARROW buttons are depressed.

27. The hand-held electronic instrument of claim 1 wherein said microcomputer measures the rate of change of the sensed environmental parameter and said software stored in said memory of said microcomputer includes an energy saving routine comprising means for switching the sampling frequency of the environmental parameter between a first low sampling rate and a second high sampling rate based on a first predetermined value for the measured rate of change.

28. The hand-held electronic instrument of claim 27 wherein said energy saving routine comprises means for turning said electronic instrument off when said measured rate of change is below a second predetermined value.

29. A hand-held electronic instrument for measuring an environmental parameter comprising:
   a housing having oppositely disposed front and rear end portions and a top panel, the housing defining a battery compartment and an electronics compartment adjacent the battery compartment;
   an electronic assembly disposed within said electronics compartment of said housing including a microcomputer comprising a memory for storing a software program and data, said battery compartment facilitating electrical communication between a battery disposed therein and said electronic assembly for providing polarized electrical power to said electronic assembly;
   a control pad mounted to said top panel of said housing for controlling the operation of said electronic assembly;
   a probe mounting member removably mounted to said front end portion of said housing and fluidically sealed thereto;
   a sensing probe mounted to said probe mounting member, said sensing probe being in electrical communication with said electronic assembly;
   a battery disposed within said battery compartment, said battery having a positive, male snap connector and a negative, female snap connector, said male and female snap connectors each having a diameter wherein said diameter of said female snap connector is greater than said diameter of said male snap connector;
   first and second electrical contacts in electrical communication with said electronic assembly; and
   a battery polarizing plate disposed intermediate said battery compartment and said first and second electrical contacts, said battery polarizing plate defining first and second openings, said first and second openings each having a size selected such that said female snap connector will extend through said first opening but not through said second opening, wherein said female snap connector extends through said first opening and said male snap connector extends through said second opening to contact said first and second electrical contacts, respectively, to provide polarized electrical power to said electronic assembly; and
   a battery door assembly removably mounted to said rear end portion of said housing for providing access to said battery compartment.

30. A hand-held electronic instrument for measuring an environmental parameter comprising:
   a housing having oppositely disposed front and rear end portions and a top panel, the housing defining a battery compartment and an electronics compartment adjacent the battery compartment;
   an electronic assembly disposed within said electronics compartment of said housing including a microcomputer comprising a memory for storing a software program and data, said battery compartment facilitating electrical communication between a battery disposed therein and said electronic assembly for providing polarized electrical power to said electronic assembly;
   a control pad mounted to said top panel of said housing for controlling the operation of said electronic assembly;
   a probe mounting member removably mounted to said front end portion of said housing and fluidically sealed thereto;
   a thermocouple probe mounted to said probe mounting member and in electrical communication with said electronic assembly, said thermocouple probe having a chromel lead, an alumel lead, a stainless steel shell, and a tip of substantially homogenous material formed from said chromel lead, said alumel lead and said stainless steel shell; and
   a battery door assembly removably mounted to said rear end portion of said housing for providing access to said battery compartment.

* * * * *